United States Patent [19]

Arter et al.

[11] Patent Number: 4,959,412
[45] Date of Patent: Sep. 25, 1990

[54] HIGH SHEAR TACKIFIER RESINS

[75] Inventors: William J. Arter, Goshen; Wayne K. Chu, Tarrytown, both of N.Y.; Erwin R. Ruckel, Wilton, Conn.; Roland P. F. Scharrer, Pelham, N.Y.

[73] Assignee: Arizona Chemical Company, Panama City, Fla.

[21] Appl. No.: 316,237

[22] Filed: Feb. 27, 1989

[51] Int. Cl.$^5$ .................. C08L 25/04; C08L 25/06; C08L 53/02
[52] U.S. Cl. .................. 525/98; 524/505; 525/95
[58] Field of Search .................. 525/98, 95; 524/505

[56] References Cited

U.S. PATENT DOCUMENTS

| | | | |
|---|---|---|---|
| 4,181,635 | 1/1980 | Takamatsu et al. | 525/98 |
| 4,714,749 | 12/1987 | Hughes et al. | 523/98 |
| 4,785,043 | 11/1988 | Kawai et al. | 524/486 |

OTHER PUBLICATIONS

Abstract of Japanese Patent 61-157,570, Iwamoto et al., 7/86.
Technical Bulletin-Shell Cariflex TR-1000 Polymers for Adhesives, Coatings and Sealants-Published Oct., 1978-Thermoplastic Rubbers Technical Manual TR 5.1.

*Primary Examiner*—Allan M. Lieberman
*Attorney, Agent, or Firm*—Luedeka, Hodges & Neely

[57] ABSTRACT

A method for the preparation of an adhesive with an improved high temperature shear strength is disclosed. The method comprises the steps of blending a styrene homopolymer with a tackifier resin to form a resin blend and combining the resin blend with an elastomer. An adhesive with improved high temperature shear strength is also disclosed.

11 Claims, No Drawings

HIGH SHEAR TACKIFIER RESINS

This invention relates to hot melt pressure sensitive and hot melt assembly adhesives.

Hot melt adhesives are replacing solvent based adhesives because they avoid the environmental problems associated with solvent based adhesives. Hot melt technology allows mixing of adhesive components by high shear mixing or simple melt mixing in normal equipment. Once mixed, the adhesive is coated as a melt on the substrate and when cooled is ready to use. There is no solvent used and no requirement for drying, thereby saving heating costs and reducing environmental pollution.

Adhesives using hot melt preparation and application technology have unique adhesive raw material requirements. In general, adhesives of all types are composed of a high molecular weight polymer which contributes cohesive strength, a low molecular weight tackifier which promotes substrate wetting and various additives such as antioxidants, stabilizers, fillers and colorants. The high molecular weight polymers used in these hot melt adhesives are those block elastomers which are thermoplastic. The use of block elastomers in hot melt adhesives is relatively new technology which began in the late 1960's. Formerly, hot melt adhesives used ethylene-vinylacetate random copolymers or amorphous polypropylene-styrene copolymers.

Block elastomers are polymeric materials which have blocks of a particular type of polymer joined to a block of another type of polymer. An example is an SBS (styrene butadiene-styrene) block copolymer. There, two blocks of polystyrene are joined to a central block of polybutadiene. When the block elastomer is cold, the styrene ends in the SBS material form spherical domains and effectively physically cross-link, producing a polymer of apparent high molecular weight and high tensile strength, similar to what would be obtained from a vulcanized rubber which has carbon-to-carbon or carbon-to-sulfur-to-carbon cross-linked double bonds. By heating the styrene domains above their "melting point," the SBS reverts to the uncrosslinked form and the effective molecular weight is dramatically reduced. The viscosity is also dramatically reduced and the material flows easily. Vulcanized rubber cannot be reduced in viscosity reversibly, but the SBS copolymer returns to its original state when cooled. Thus, the block elastomers are "thermoplastic".

Thermoplastic block elastomers find use for hot melt adhesives since their viscosity is low enough to process the elastomers into adhesives. These adhesives gain their cohesive strength when the thermally reversible cross-link reforms on cooling. Normally an adhesive is made by mixing a thermoplastic elastomer with a tackifier resin. The tackifier resin must be "designed" by use of solubility parameters (compatibilities) to stay in the rubbery portion of the adhesive. If not designed correctly, the tackifier creeps into the styrene domains and reduces the tensile strength. In addition, the temperature at which shear adhesion fails is also reduced. A usable adhesive must have good adherence throughout the temperature range to which it is subject. The shear failure temperature must be high enough to ensure good adhesion across the temperature range.

Therefore, it is an object of the present invention to provide an adhesive with a high shear strength at relatively high temperatures while retaining the tensile strength of the adhesive at room temperature.

The present invention provides a method for the preparation of an adhesive with an improved high temperature shear strength. The method comprises the steps of blending a styrene homopolymer with a tackifier resin and forming a resin blend. The resin blend is then combined with an elastomer to form the adhesive. The elastomer used in a preferred method is selected from the group consisting of block copolymers of an ABA type, multiblock copolymers of an $(AB)_n$ type and radial block copolymers of an

type where the A block is a polystyrene block and the B block is selected from the group consisting of polybutadiene, polyisoprene and mixed polyethylene-polybutylene. Examples of ABA block copolymers include KRATON® 1102 (Shell) (styrene-butadiene-styrene), KRATON® D 1107 (styrene-isoprene-styrene) and KRATON®G 1652 (styrene-ethylene/butylene-styrene). STEREON® 840 (Firestone) is an example of a multiblock copolymer (styrene-butadiene) and SOLPRENE® 423 (Philips Petroleum) is an example of a radial block copolymer (styrene-isoprene-styrene).

Polystyrene is used as the blending homopolymer when the elastomer is a block copolymer of one of the types described above. In a preferred embodiment, the homopolymer chosen has a molecular weight distribution which fits within the envelope of the molecular weight distribution of the tackifier resin. The tackifier resin used in a preferred method is selected from the group consisting of alpha pinene-based resins, beta pinene-based resins, limonene-based resins, piperylene-based hydrocarbon resins, aromatic modified polyterpene resins, aromatic modified piperylene-based hydrocarbon resins, aromatic modified dicyclopentadiene-based hydrocarbon resins and aromatic modified co-terpene and ter-terpene resins.

In order to produce a resin blend, the tackifier resin is blended with the homopolymer. There are various ways of producing a resin blend and one way is by melt blending the homopolymer with the tackifier resins. A preferred resin blend is produced by blending from about ten weight percent to about twenty-five weight percent of the homopolymer with from about ninety weight percent to about seventy-five weight percent of the tackifier resin.

The present invention also provides for an adhesive comprised of an elastomer and a resin blend. The resin blend is further comprised of a tackifier resin and a styrene homopolymer. The adhesive has an improved high temperature shear strength when compared with adhesives of the prior art. The elastomer of a preferred adhesive is selected from the group consisting of block copolymers of the ABA type, multiblock copolymers of the (AB)n type and radial block copolymers of the

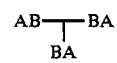

type where the A block is polystyrene and the B block is selected from the group consisting of polybutadiene, polyisoprene and mixed polyethylene - polybutylene.

Polystyrene is used as the homopolymer when the elastomer is a block copolymer of one of the types described above. In a preferred embodiment the homopolymer is chosen to have a molecular weight distribution which fits within the envelope of the molecular weight distribution of the tackifier resin. The tackifier resin of a preferred adhesive is selected from the group consisting of alpha pinene-based resins, beta pinene-based resins, limonene-based resins, aromatic modified terpene resins, piperylene-based hydrocarbon resins, aromatic modified piperylene-based hydrocarbon resins, aromatic modified dicyclopentadiene-based hydrocarbon resins and aromatic modified co-terpene and ter-terpene resins.

The resin blend may be mixed in various proportions of tackifier resin to homopolymer. In a preferred embodiment of the invention, the resin blend is composed of from about ninety weight percent to about seventy-five weight percent of the tackifier resin and from about ten weight percent to about twenty-five weight percent of the homopolymer.

The mechanism of the invention is not wholly understood. However, as may be seen in the accompanying Examples, the invention does provide for an adhesive with an improved high temperature shear strength. Without being bound to the theory, it is believed that the homopolymer of the present invention moves into the styrene domains of the elastomer associated with the cold temperature cross-linking in elastomers. The presence of the homopolymer (for example, polystyrene in a preferred embodiment) in those styrene domains substantially prevents the migration of the tackifier resins into those domains. Since the tackifier resin in the presence of the homopolymer does not migrate into the cold temperature cross-linking domains, it is available in the body of the elastomer for wetting a surface. Surprisingly, the presence of the low molecular weight homopolymer does not reduce the cross-linking strength of the elastomer but instead enhances that strength.

In a preferred embodiment of the invention the elastomer used is a butadiene-styrene multi-block copolymer such as STEREON ® 840A (Firestone). The elastomer has styrene domains which operate as the cold temperature cross-linking domains. As pointed out above, we believe the polystyrene homopolymer migrates into these domains and thus excludes the tackifier resin leaving it free to promote substrate wetting.

In order to provide a better understanding of the present invention, the following non-limiting examples are provided.

EXAMPLE 1

Preparation of Typical Tackifier Resins-

This example describes the preparation of various terpene and hydrocarbon tackifier resins usable in this invention. This procedure may be modified as to, for example, time, temperature or quantities by one skilled in the art to produce the same materials. For example, resins can be produced by continuous techniques.

To 500 mL of p-xylene, there were added 18g of anhydrous aluminum chloride. The mixture was stirred and provisions for external cooling were made. Additions of 600g of a monomer mixture consisting of 78 wt% beta-pinene and 22 wt% limonene were begun. When the reaction temperature reached 45° C., external cooling was initiated and further monomer additions were at a rate such that the temperature remained at 45° C. Approximately one hour was required to complete monomer addition. After monomer addition was complete, the reaction mixture was maintained at 45° C. for an additional 30 minutes. The aluminum chloride was then removed by washing the xylene solution with 2% aqueous hydrochloric acid followed by deionized water washes until the water wash was neutral. The xylene was then removed by Yield of the copolymer was 95-98 percent. Properties of this and other copolymers prepared in a similar manner are given in Table I.

TABLE I

| Tackifier Resin | Monomer Feed | | | | Molecular Weight[1] | | | Yield % | Softening[2] Point °C. |
|---|---|---|---|---|---|---|---|---|---|
| | Beta-Pinene | Alpha-Pinene | Limonene | Styrene | $M_n$ | $M_w$ | $M_z$ | | |
| A | 78 | — | 22 | — | 1020 | 2390 | 5880 | 96 | 118 |
| B | — | — | 75 | 25 | 740 | 1500 | 3530 | 92 | 105 |
| C | 40 | 25 | 15 | 20 | 780 | 1580 | 3710 | 98 | 85 |

[1]$M_n$ is the number average of molecular weight; $M_w$ is the weight average of molecular weight; $M_z$ is the "Z" average of molecular weight.
[2]Ring and ball softening point, ASTM E-28-58T.

EXAMPLE 2

Preparation of a Homopolymer-

To 500 mL of dry p-xylene, there were added 18g of anhydrous aluminum chloride. The mixture was stirred and provisions for external cooling were made. Addition of 600g of dry styrene was begun. When the reaction temperature reached 45° C., external cooling was initiated and further monomer additions were at a rate such that the temperature remained at 45° C. Approximately one hour was required to complete monomer addition. After monomer addition was complete, the reaction mixture was maintained at 45° C. for an additional 30 minutes. The aluminum chloride was then removed by washing the xylene solution with 2 percent aqueous hydrochloric acid followed by deionized water washes until the wash water was neutral. The xylene was then removed by vacuum distillation. The yield of the homopolymer was 98% with a ring and ball softening point of 82° C. The homopolymer was stripped further to produce a final yield of product of 87 percent with a ring and ball softening point of 101.5° C. The number average molecular weight was 1300.

EXAMPLE 3

Preparation of a Resin Blend-

A tackifier resin from Table I was heated to 180° C under an inert nitrogen atmosphere. With stirring, a portion of solid polystyrene homopolymer from Example 2 was added to the molten resin. The resin and homopolymer were mutually soluble. Table II shows the proportions of mixing. Table II also shows the increase in the shear adhesion failure temperature of those tackifiers prepared with the added polystyrene homopolymer.

TABLE II

| Resin Blend | Tackifier Resin (Table I) | Weight Percent Tackifier Resin | Weight Percent Polystyrene Homopolymer | Shear Adhesion Failure Temperature °C. |
|---|---|---|---|---|
| A | B | 100 | 0 | 148.0 |
| B | B | 85 | 15 | 158.0 |
| C | C | 100 | 0 | 150.3 |
| D | C | 85 | 15 | 155.4 |

EXAMPLE 4

Preparation of an Adhesive-

A resin blend of Table II was heated to 177° C. under an inert nitrogen atmosphere. A portion of the elastomer and naphthenic oil were added to the stirred molten resin. Additives such as antioxidants were also added. Table III shows the proportions of mixing. The adhesives were then subjected to measurements of shear strength at elevated temperature. Table IV shows the results of those measurements. It is evident from a comparison of the measurement of Adhesives A and C (without any homopolymer) with the measurement of Adhesives B and D (with polystyrene in the resin blend) that the addition of the homopolymer improves the high temperature shear strength. Adhesives B and D show a 2 to 4 fold increase in shear strength at 40.6° C. The measurement also shows an improvement in loop tack.

TABLE III

| Adhesive | Elastomer Type | Resin Blend Type (Table II) | Parts By Weight Elastomer | Parts By Weight Resin Blend | Parts By Weight Naphthenic Oil | Parts By Weight Antioxidant |
|---|---|---|---|---|---|---|
| A | STEREON ® 840A | A | 40 | 60 | 20 | 2 |
| B | STEREON ® 840A | B | 40 | 60 | 20 | 2 |
| C | STEREON ® 840A | C | 30 | 55 | 15 | 2 |
| D | STEREON ® 840A | D | 30 | 55 | 15 | 2 |

TABLE IV

| Adhesive (Table III) | Shear Strength[1] (Hours) | Loop Tack[2] (pli) |
|---|---|---|
| A | 4.6 | 33 |
| B | 21 | 40 |
| C | 8.5 | 26 |
| D | 16.5 | 31 |

[1]Hours of holding time using one square inch of adhesive to bond to paper holding a 300 g weight at 40.6° C.
[2]pounds per linear inch.

It may be seen from the foregoing that the present invention provides for a great improvement in adhesive strength over the prior art.

An adhesive of the present invention has surprisingly good adhesion at relatively elevated temperatures. In addition, the shear strength at room temperature is unexpectedly improved. An adhesive of the present invention or one prepared by the method of the present invention is an important improvement over the prior art.

Various of the features of the invention which are believed to be novel are set forth in the appended claims.

What is claimed is:

1. A method for the preparation of an adhesive with an improved high temperature shear strength comprising the steps of:
   blending from about 10 weight percent to about 25 weight percent of a styrene homopolymer with from about 90 weight percent to about 75 weight percent of a tackifier resin and forming a resin blend; and
   combining an effective amount of the resin blend with a block copolymer thermoplastic elastomer with at least one styrene domain and forming an adhesive.

2. The method of claim 1 wherein the elastomer is selected from the group consisting of a block copolymer of an ABA types, a multiblock copolymer of an $(AB)_n$ type and a radial block copolymer of an

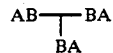

type where the A block is polystyrene and the B block is selected from the group consisting of polybutadiene, polyisoprene and mixed polyethylene-polybutylene.

3. The method of claim 2 wherein the homopolymer is polystyrene.

4. The method of claim 3 wherein the polystyrene has a number average molecular weight range of between about 900 and about 1500.

5. The method of claim 1 wherein the step of blending comprises melt blending the homopolymer with the tackifier resin.

6. The method of claim 1 wherein the tackifier resin is selected from the group consisting of alpha pinene-based resin, beta pinene-based resin, limonene-based resin, aromatic modified limonene-based resin, piperylene-based hydrocarbon resin, aromatic modified dicyclopentadiene-based hydrocarbon resin and aromatic modified co-terpene and ter-terpene resins.

7. An adhesive comprising:
   a block copolymer thermoplastic elastomer with at least one styrene domain; and
   a resin blend further comprising:
   from about 90 percent to about 75 weight percent of a tackifier resin; and
   from about 10 weight percent to about 25 weight percent of a styrene homopolymer whereby the adhesive has an improved high temperature shear strength.

8. The adhesive of claim 7 wherein the elastomer is selected from the group consisting of a block copolymer of an ABA type, a multiblock copolymer of an $(AB)_n$ type and a radial block copolymer of an

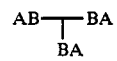

type where the A Block is polystyrene and the B block is selected from the group consisting of polybutadiene, polyisoprene and mixed polyethylene-polybutylene.

9. The adhesive of claim 8 wherein the homopolymer is polystyrene.

10. The adhesive of claim 9 wherein the polystyrene has a molecular weight range of between about 900 and about 1500.

11. The adhesive of claim 7 wherein the tackifier resin is selected from the group consisting of alpha pinene-based resin, beta pinene-based resin, limonene-based resin, aromatic modified limonene-based resin, piperylene-based hydrocarbon resin, aromatic modified dicyclopentadiene-based hydrocarbon resin and aromatic modified co-terpene and ter-terpene resins.

* * * * *

UNITED STATES PATENT AND TRADEMARK OFFICE
CERTIFICATE OF CORRECTION

PATENT NO. : 4,959,412

DATED : September 25, 1990

INVENTOR(S) : William J. Arter, Wayne K. Chu, Erwin R. Ruckel and Roland P. F. Scharrer It is certified that error appears in the above-identified patent and that said Letters Patent is hereby corrected as shown below:

Column 2, line 22, after "KRATON®" insert -- D --.

Column 4, line 18, after "by" insert -- vacuum distillation. --

Signed and Sealed this

Seventeenth Day of November, 1992

Attest:

DOUGLAS B. COMER

Attesting Officer     Acting Commissioner of Patents and Trademarks